United States Patent
Vandermolen

(10) Patent No.: US 8,726,017 B2
(45) Date of Patent: *May 13, 2014

(54) DATA STORAGE AND REMOVAL

(75) Inventor: Harmannus Vandermolen, Leesburg, VA (US)

(73) Assignee: Bright Sun Technologies, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/236,541

(22) Filed: Sep. 19, 2011

(65) Prior Publication Data

US 2012/0072726 A1    Mar. 22, 2012

Related U.S. Application Data

(63) Continuation of application No. 11/019,122, filed on Dec. 22, 2004, now Pat. No. 8,024,572.

(51) Int. Cl.
*H04L 29/06* (2006.01)
*G06F 21/62* (2013.01)

(52) U.S. Cl.
CPC ............................. *G06F 21/6218* (2013.01)
USPC ........... 713/167; 713/165; 713/178; 713/189; 713/193; 726/2; 726/26; 726/27; 380/277; 707/705; 707/781; 707/783; 707/784; 707/785; 707/662; 707/666; 707/689

(58) Field of Classification Search
CPC .................................................. G06F 21/6218
USPC ....................................................... 713/167
See application file for complete search history.

(56) References Cited

U.S. PATENT DOCUMENTS

| | | |
|---|---|---|
| 4,899,299 A | 2/1990 | MacPhail |
| 4,941,176 A | 7/1990 | Matyas et al. |
| 5,107,419 A | 4/1992 | MacPhail |
| 5,212,788 A | 5/1993 | Lomet et al. |
| 6,134,660 A * | 10/2000 | Boneh et al. .................. 713/193 |
| 6,915,435 B1 | 7/2005 | Merriam |
| 7,277,876 B2 | 10/2007 | Solomon |
| 7,363,326 B2 | 4/2008 | Margolus |
| 7,490,248 B1 * | 2/2009 | Valfridsson et al. .......... 713/193 |

(Continued)

OTHER PUBLICATIONS

Soumyadeb Mitra and Marianne Winslett, "Secure Deletion from Inverted Indexes on Compliance Storage", ACM, Oct. 30, 2006, pp. 67-72.*

(Continued)

*Primary Examiner* — Luu Pham
*Assistant Examiner* — Canh Le
(74) *Attorney, Agent, or Firm* — Fenwick & West LLP

(57) ABSTRACT

A system and method for data storage and removal includes providing databases and providing encryption keys. Each database is associated with a database time period and each encryption key is associated with an encryption time period. Data items are received and each data item is encrypted using the encryption key associated with the encryption time period that corresponds to a time associated with the data item. Each encrypted data item is stored in the database associated with the database time period that corresponds to the time associated with the data item. Each encryption key is deactivated at a predetermined time after the associated encryption time period ends. Each database is made irretrievable upon a determination that all of the encryption keys associated with the data items stored in that database have been deactivated.

16 Claims, 6 Drawing Sheets

(56) References Cited

U.S. PATENT DOCUMENTS

| | | | |
|---|---|---|---|
| 2002/0029350 A1 | | 3/2002 | Cooper et al. |
| 2002/0087552 A1 | | 7/2002 | Applewhite et al. |
| 2002/0194502 A1 | | 12/2002 | Sheth et al. |
| 2003/0204420 A1 | | 10/2003 | Wilkes et al. |
| 2004/0099727 A1 | * | 5/2004 | Magee et al. ............ 235/379 |
| 2004/0167903 A1 | | 8/2004 | Margolus et al. |
| 2005/0055519 A1 | | 3/2005 | Stuart et al. |
| 2005/0223242 A1 | | 10/2005 | Nath |
| 2005/0223414 A1 | * | 10/2005 | Kenrich et al. ............ 726/27 |
| 2005/0238175 A1 | | 10/2005 | Plotkin et al. |
| 2005/0289123 A1 | | 12/2005 | Dettinger et al. |
| 2006/0085837 A1 | | 4/2006 | Pesati et al. |
| 2006/0106812 A1 | * | 5/2006 | Blumenau et al. ............ 707/10 |
| 2007/0033200 A1 | | 2/2007 | Gillespie |

OTHER PUBLICATIONS

Dorothy E. Denning and Dennis K. Branstad, "A Taxonomy for Key Escrow Encryption Systems", communication of the ACM, Mar. 1996/vol. 39, No. 3, pp. 34-40.*

"Why use A9.com," retrieved from http://a9.com/-/company/whatsCool.jsp, Oct. 28, 2004 (4 pages).

"Company, A9.com," retrieved from http://a9.com/-/company, Oct. 28, 2004 (1 page).

"NetReaper—Extract Web with powerful agents," retrieved from http://www.chimerasoft.com/chimerasoft/netreaper, Oct. 28, 2004 (2 pages).

"Reaper," retrieved from http://folkworm.ceri.memphis.edu/ew-doc/DBMS/API-OC/EWDB_APPLICATIONS, Oct. 28, 2004 (1 page).

"Purging Database Records" (3 pages).

"Pythagoras CRM Services Merge & Purge Database Records," retrieved from http://services.pythagoras.co.uk/services_merge_purge.htm, Oct. 28, 2004 (1 page).

"Pythagoras CRM Services Data Cleansing," retrieved from http://services.pythagoras.co.uk/services_cleansing.htm, Oct. 28, 2004 (1 page).

"Archiving and Purging Old Learner Records," retrieved from http://www.masterytech.com/yepurge.htm, Oct. 28, 2004 (4 pages).

"Purgint," retrieved from http://www.pss.st/librarium/manual/purging.html, Oct. 28, 2004 (5 pages).

"Defining database purge preferences," retrieved from http://publib.boulder.ibm.com/tividd/td/ITMFNP/SC316364-00/en_US/HTML/MNPAD, Oct. 28, 2004 (3 pages).

"Software Download: Data," retrieved from http://www.sharewareconnection.com/titles/data3.htm, Oct. 28, 2004 (10 pages).

U.S. Appl. No. 60/628,806, filed Nov. 17, 2004 (31 pages).

* cited by examiner

DATA STORAGE AND REMOVAL

RELATED APPLICATION(S)

This application is a continuation of and claims the benefit of priority of U.S. patent application Ser. No. 11/019,122, filed Dec. 22, 2004 now U.S. Pat. No. 8,024,572, the disclosure of which is incorporated herein by reference in its entirety.

TECHNICAL FIELD

This disclosure relates to storage and removal of data from a database.

BACKGROUND

Computer systems often perform data storage and data removal by independent processes. Data may be stored in databases by writing the data to the databases as the data is input to the system. In order to reduce the aggregated amount of storage space being used to store data, a portion of the data may be periodically removed or expired using purging processes known as "reaper processes" or "garbage collectors." One exemplary method iterates or searches through the database to determine which data, such as older data, to purge from the database.

DETAILED DESCRIPTION

An integrated method of data storage and removal efficiently reduces the use of storage space by periodically removing old data, while minimizing computer resources needed for search and iteration through the data. During a first database time period (e.g., days 1-30), data is received, encrypted using a unique encryption key (e.g., a different encryption key for each day), and stored in a first database. During a second database time period (e.g., days 31-60), the data is received, encrypted using a unique encryption key (e.g., a different encryption key for each day) and stored in a second database. Each encryption key is kept active for a predetermined amount of time after its use (e.g., for 20, 30, or 40 days) to allow access and retrieval of the data that was stored using that encryption key.

At the end of the predetermined time period, the key is deactivated (e.g., by deleting the key), so that the data stored with that key is no longer accessible. When it is determined that all of the encryption keys for the first database have been deactivated (e.g., on day 61), the entire first database is made irretrievable (e.g., by deleting the data in the first database) without having to search through the data in the first database. This determination can be made in at least one of two ways.

First, as described below with respect to FIG. 1, the determination can be made by use of a counter that counts the number of days after which a key has been used to determine whether a key is still active. Second, as described below with respect to FIG. 3, the determination can be made by checking a log of keys that have been deactivated. During a third time period (e.g., days 61-90), new data is encrypted, and can be stored either in the first database (overwriting the old data) or in a new third database. These cycles of deactivating encryption keys and making the databases irretrievable can continue ad infinitum.

The periodic deactivation of the encryption keys create a moving window of time (e.g., 30 days long) during which data is accessible, thus providing the equivalent of data deletion for purposes of security and privacy. When an entire database is made irretrievable periodically after all of the encryption keys have been deactivated it may also be possible to enable removal of data without requiring search or review of the data, saving storage space, data removal time, and processing resources. Thus, a quick and inexpensive method for data storage and data removal is provided.

Figure 1:
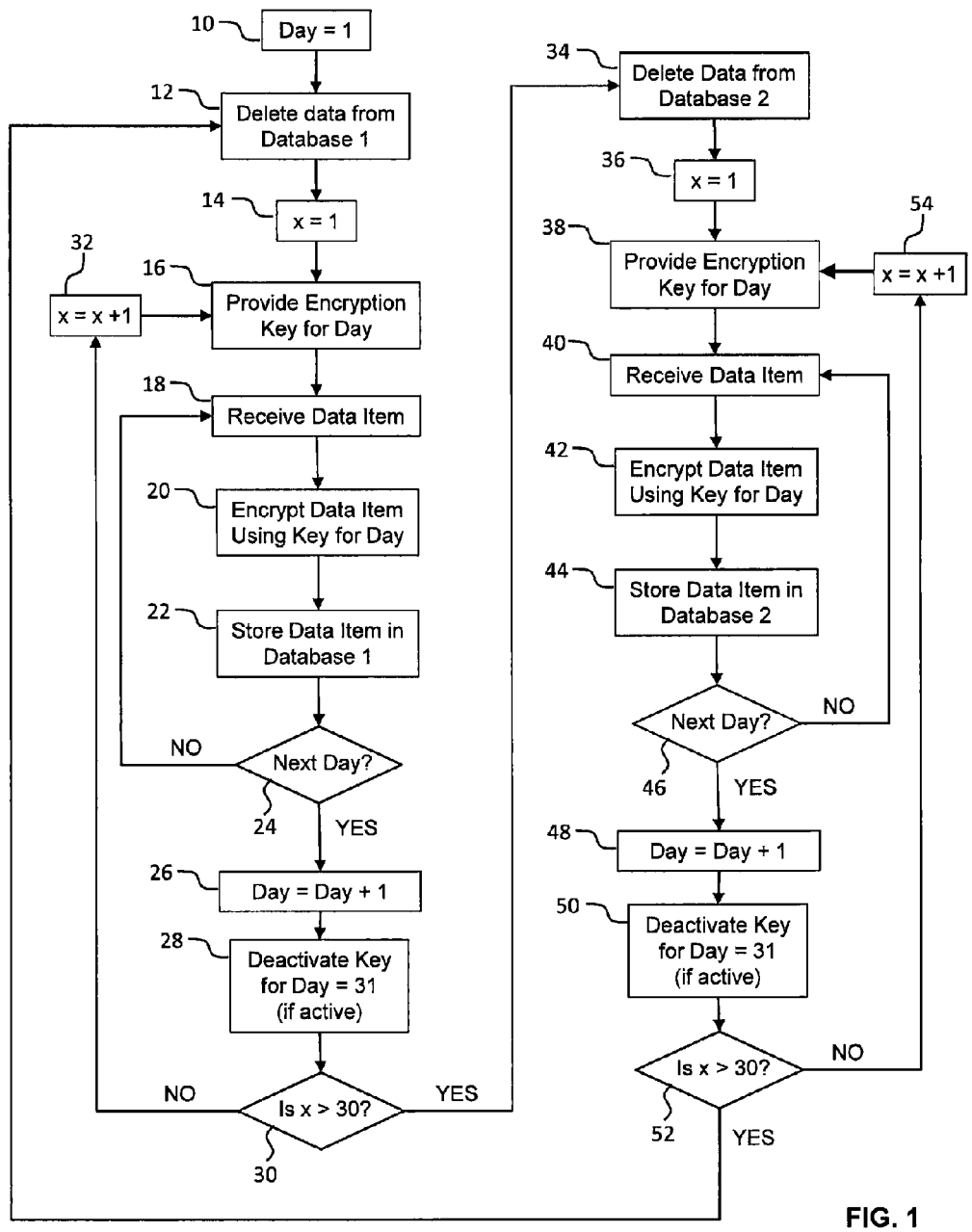
FIG. 1 is a flow chart of one implementation of a method for data storage and removal.

Referring to FIG. 1, a flow diagram illustrates an implementation of this method using two databases, Database 1 and Database 2. At step 10, a counter Day, which counts the number of days, is initialized to one. In this implementation, each day corresponds to an encryption time period. At step 12, Database 1 is initialized by deleting all the data from Database 1. At step 14, a counter x, which refers to the number of days that data has been stored in Database 1, is set to 1. In this implementation, the number of days that data may be stored in Database 1 is 30 and corresponds to a database time period. At step 16, an encryption key is provided for Day 1, the first encryption time period. At steps 18, 20, and 22, data items are received, encrypted using the encryption key for Day 1, and stored in Database 1. At step 24, a determination is made as to whether Day 1 has passed. If not, the method loops back to step 18 and continues to receive data, encrypt data using the encryption key from Day 1, and store data in Database 1.

Once it is determined that Day 1 has passed, at step 26, the counter Day is incremented by one to Day 2 (i.e., the next encryption time period). Step 28 is skipped because there is no active encryption key for Day-29; this step is described in more detail below. At step 30, the method queries whether the counter x is greater than 30 (i.e., the maximum number of days that data may be stored in Database 1). Since x=1, and thus is less than or equal to 30, the counter x is incremented by one (step 32) and the method loops back to step 16 to generate a new encryption key for Day 2. This loop continues generating a new encryption key each day, encrypting data, and storing the encrypted data in Database 1 until x is greater than 30 (i.e., at the beginning of Day 31). For the first 30 days of storing data in Database 1, there are no active keys to deactivate at step 28.

On Day 31, the method continues to the next database time period by storing data in Database 2. At step 34, Database 2 is initialized by deleting all of the data. At step 36, counter x is reset to one. At step 38, an encryption key is provided for Day 31. At steps 40, 42, and 44, data items are received, encrypted using the encryption key for Day 31, and stored in Database 2. At step 46, a determination is made as to whether Day 31 has passed. If not, the method loops back to step 40 and continues to receive data, encrypt data using the encryption key from Day 31, and store that data in Database 2.

Once it is determined, at step 46, that Day 31 has passed, at step 48, the counter Day is incremented by one to Day 32. At step 50, the encryption key for Day 1 (which was used to encrypt data stored in Database 1) is deactivated (e.g., by deleting the encryption key, placing the encryption key in an escrow that cannot be easily accessed and/or otherwise making the encryption key unavailable to a user). At step 52, the method queries whether the counter x is greater than 30 (i.e., the maximum number of days to store data in Database 2). Because x is less than or equal to 30, the counter x is incremented by one (step 54) and the method loops back to step 38 to generate a new encryption key for Day 32. This loop continues generating a new encryption key each day, encrypting data, storing the encrypted data in Database 2, and deactivating the encryption key that is 31 days old, until x is greater than 30 (i.e., at the beginning of Day 61).

Because the length of time to use each database is 30 days, and because the encryption key that is thirty one days old is always deactivated, At the beginning of day 61, all of the encryption keys that were used to encrypt data stored in Database 1 (i.e., the data encrypted with the keys from days 1-30) have been deactivated. Thus, none of the data in Database 1 can be accessed. At this time, the method loops back to step 12 and makes Database 1 irretrievable, e.g., by deleting the data in Database 1, reformatting Database 1 and overwriting Database 1 with new data from Days 61-90. During Days 61-90, the method loops through steps 12 through 32, encrypting and storing new data in Database 1 and deactivating the encryption keys from Days 31-60 that were used to store data in Database 2. On Day 91, all of the keys used to store data in Database 2 have been deactivated, and the method loops to step 34 to delete all of the data from Database 2 and begin storing Data for Days 91-120 in Database 2.

The above method continues ad infinitum alternating every 30 days between storing data in Database 1 and storing data in Database 2. The periodic deactivation of the encryption keys, thus, create a moving 30 day window during which data can be accessed from the databases. Every 30 days, all of the data in the moving window is stored in only one of the databases and the data in the other database can be made irretrievable without having to search through the data in that database. This minimizes storage capacity while not having to perform a burdensome search for data that is more than 30 days old before making that data irretrievable.

Figure 2:
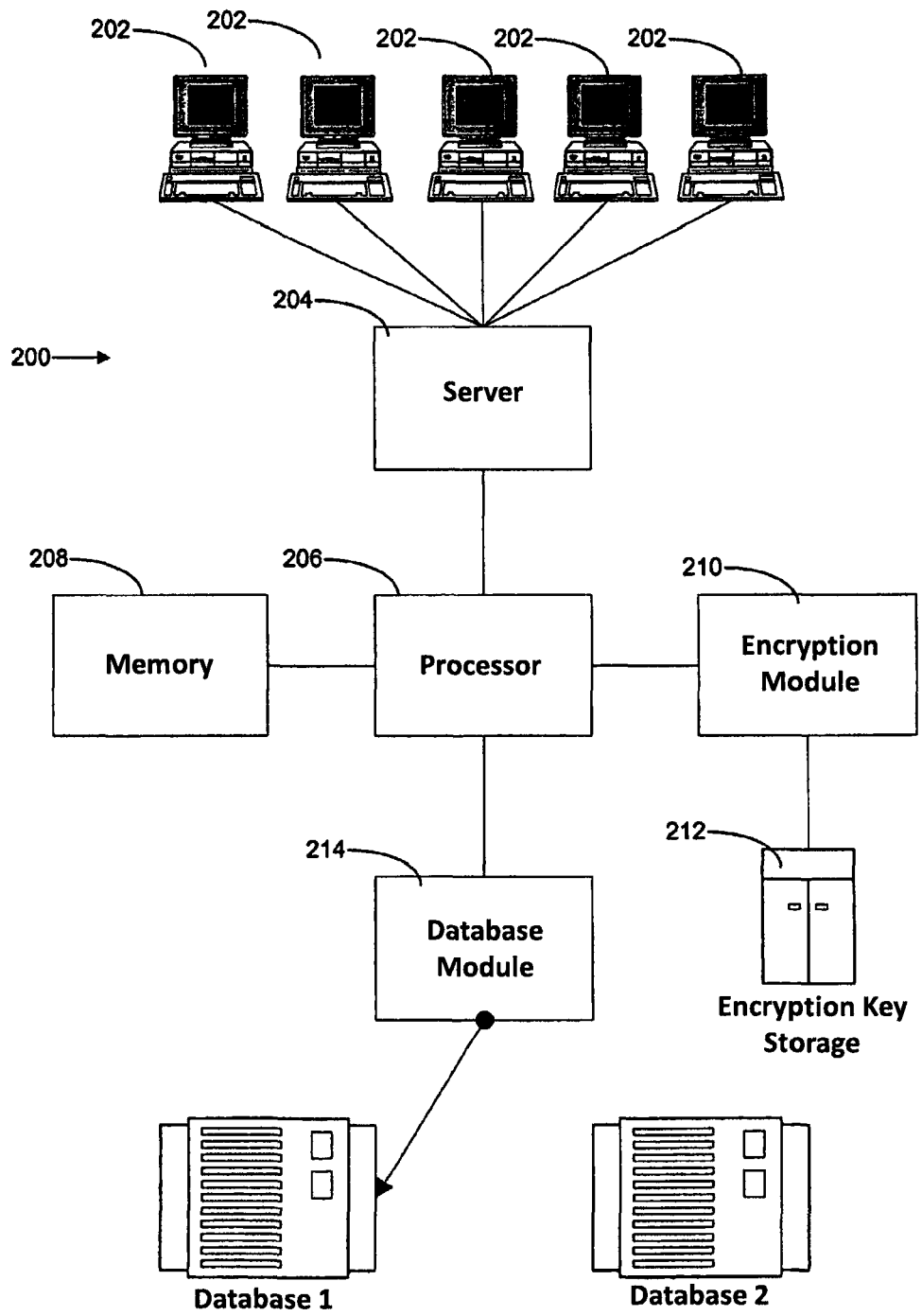
FIG. 2 is a computer system configured to execute the method outlined in FIG. 1.

The above method can be implemented on computer hardware or software, on a computer network, or on a system. FIG. 2 illustrates an implementation of a system 200 used to carry out this method. The system includes one or more client computers 202 that are coupled to a central server 204 by one or more of, for example, an Ethernet connection, a wireless network connection, a LAN, a WAN, an Internet connection, or another client or server. The server 204 is coupled to a processor 206 for executing instructions for the method that are stored in a memory 208, such as a hard disk, a CD ROM, a floppy disk, an integrated circuit board, a computer chip, or a memory card or stick. Coupled to the processor 206 is an encryption key module 210 and an encryption key storage 212 that together generate, store, and deactivate encryption keys used for the method. Also coupled to the processor 206 is a database control module 214 that selects, stores, retrieves, and deletes data from Database 1 and Database 2.

Figure 3:
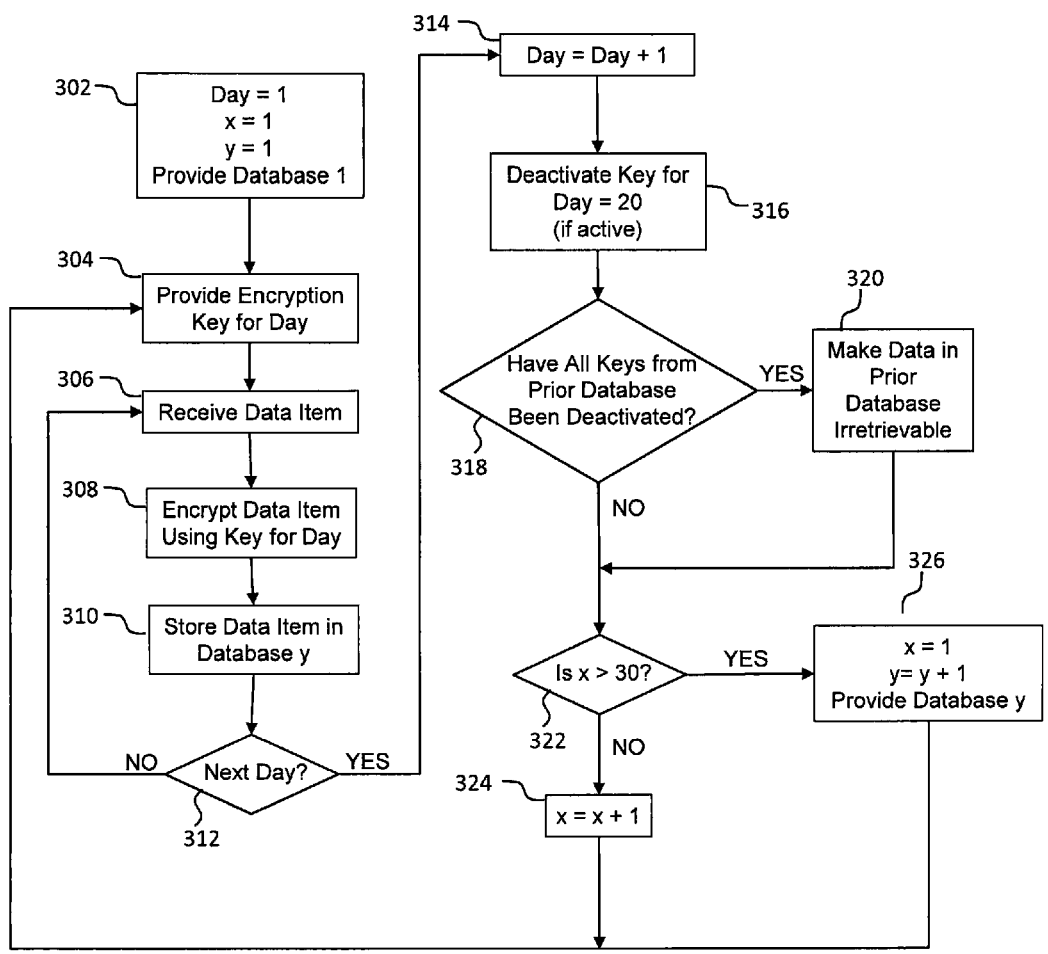
FIG. 3 is a flow chart of another implementation of a method for data storage and removal.

Referring to FIG. 3, a flow diagram illustrates another implementation that makes use of more than two databases, does not overwrite data in a database and that has a predetermined time for encryption key deactivation (20 days) with a different length than the length of the database time period (30 days). At step 302, a counter Day is initialized to one, a counter x for the number of days data has been stored in a given database is initialized to one, a counter y for the number of the database currently being used for storage is initialized to 1, and a Database 1 is provided. At step 304, an encryption key is provided for Day 1 (i.e., the first encryption time period). At steps 306, 308, and 310, data items are received, encrypted using the encryption key for Day 1, and stored in Database 1. At step 312, a determination is made as to whether it is the next day. If not, the method loops back to step 306 and continues to receive data, encrypt data using the encryption key for Day 1, and store data in Database 1.

Once it is determined that it is the next day, at step 314, the counter Day is incremented by one to Day 2 (i.e., the next encryption time period). Step 316 is skipped because there is no active encryption key for Day-18. At step 318, the method queries whether all of the keys in Database 0 have been deactivated. Because Database 0 is non-existent, the answer is "no" and the method continues to step 322, which queries whether the counter x is greater than 30 (i.e., the number of days to store data in each Database). Since x equals 2, which is less than or equal to 30, the counter x is incremented by one (step 324) and the method loops back to step 304 to generate a new encryption key for Day 2. This loop continues generating a new encryption key each day, encrypting data, and storing the encrypted data in Database 1.

At the beginning of Day 21 (step 314), the encryption key from Day 1 is deactivated, such as by deleting it, placing it in an escrow that cannot be easily accessed, or otherwise making it inaccessible to a user (step 316). The method continues to deactivate encryption keys that are more than 20 days old at each pass through step 316, thus creating a moving window of retrievable data that is 20 days old. It should be understood that the 20 day window is exemplary. The time period after which an encryption key is deactivated could have any length of time, including a length of time that is less than, equal to, or longer than the length of time that data is stored in a given database.

At the beginning of Day 31, at step 322, it is determined that x is greater than 30 (i.e., the time for storing data in Database 1 has expired). At step 326, the counter y is incremented from 1 to 2, Database 2 is provided, and the counter x is reset to 1. The method then loops back to step 304 to generate a new encryption key for Day 31, receive data (step 306), encrypt the data (step 308), and store the data in Database 2 (step 310). For Days 31-60, this loop continues to generate a new encryption key each day, to receive data, to encrypt data, and to store the encrypted data in Database 2. At the beginning of Day 61, a new Database 3 is provided (step 326), and the same process continues, storing the encrypted data in Database 3. Thereafter, a new Database is provided every 30 days and the process continues, ad infinitum. This implementation assumes a constant supply of new databases. In another implementation, databases can be reused after a predetermined period of time, or after one or more other databases have been filled.

During each pass through the loop, at step 318, the method queries whether all of the encryption keys from the prior database (e.g., Database 1) have been deactivated. This can be done, for example, in one or more of at least two ways. First, this determination can be made by keeping and checking a register of keys that have been deactivated. Second, this determination can be made by using a mathematical algorithm or counter that computes when each key becomes deactivated based on the length of time each key is active and the length of time data is stored in each database. If all of the keys from a previous database have been deactivated, the data in that database can no longer be accessed, and, at step 320, that database is made irretrievable. This can be done, for example, by placing the data in an escrow, locking the database, deleting the data in the database, reformatting the database, or overwriting the data in the database.

Figure 4:
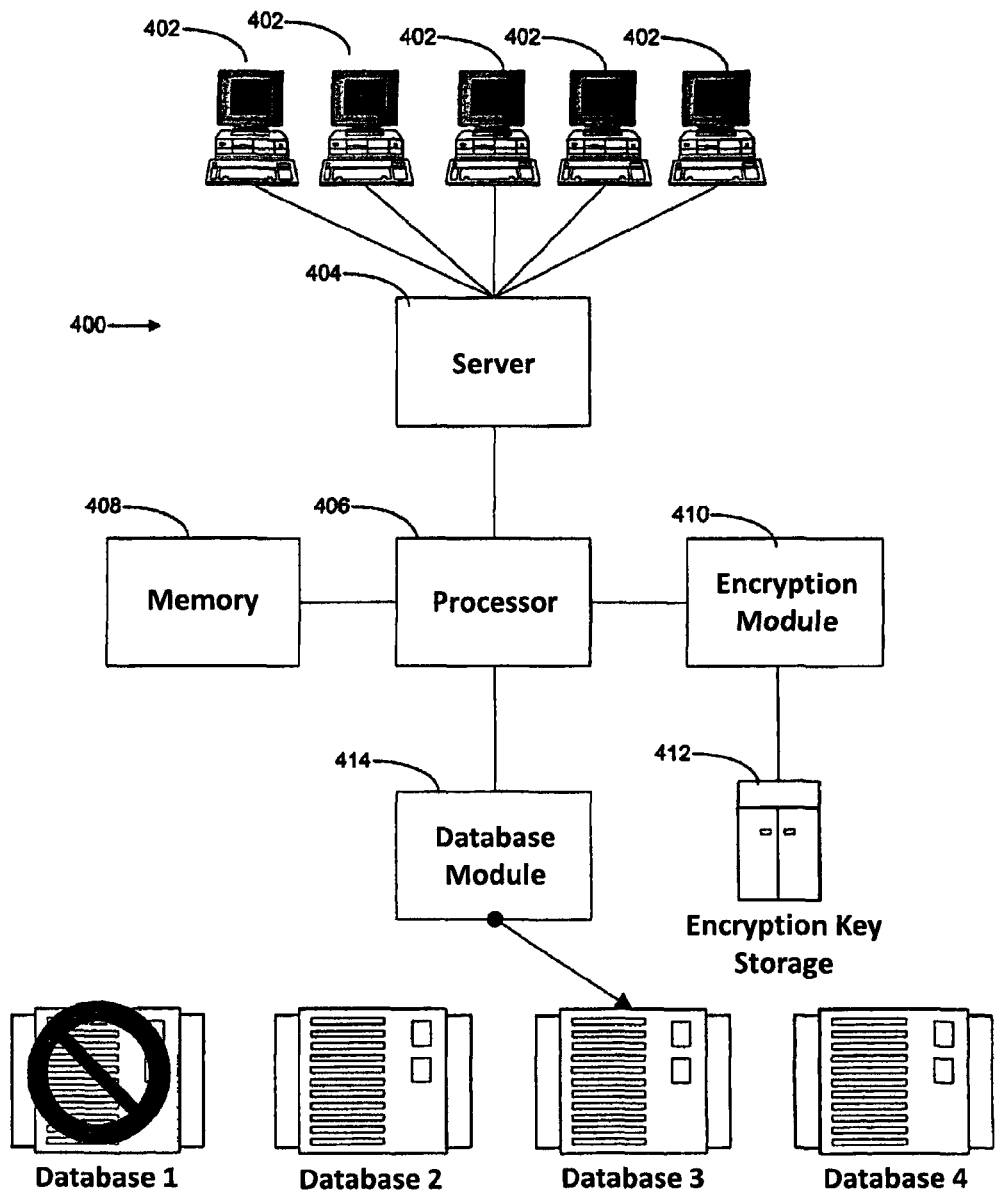
FIG. 4 is a computer system configured to execute the method outlined in FIG. 3.

The above method can be implemented on computer hardware or software, on a computer network, or on a system. FIG. 4 illustrates an implementation of a system 400 used to carry out this method. The system includes one or more client computers 402 that are coupled to a central server 404 by one or more of, for example, an Ethernet connection, a wireless network connection, a LAN, a WAN, an Internet connection, or another client or server. The server 404 is coupled to a processor 406 for executing instructions for the method that are stored in a memory 408, such as a hard disk, a CD ROM, a floppy disk, an integrated circuit board, a computer chip, or a memory card or stick. Coupled to the processor 406 is an encryption key module 410 and an encryption key storage 412 that together generate, store, and deactivate encryption keys used for the method. Also coupled to the processor 406 is a database control module 414 that provides, selects, stores, retrieves, locks, and deletes data from Databases 1, 2, 3, 4, etc. As shown in FIG. 4, Database 1 has been made irretrievable, while data is being written to Database 3.

Figure 5:
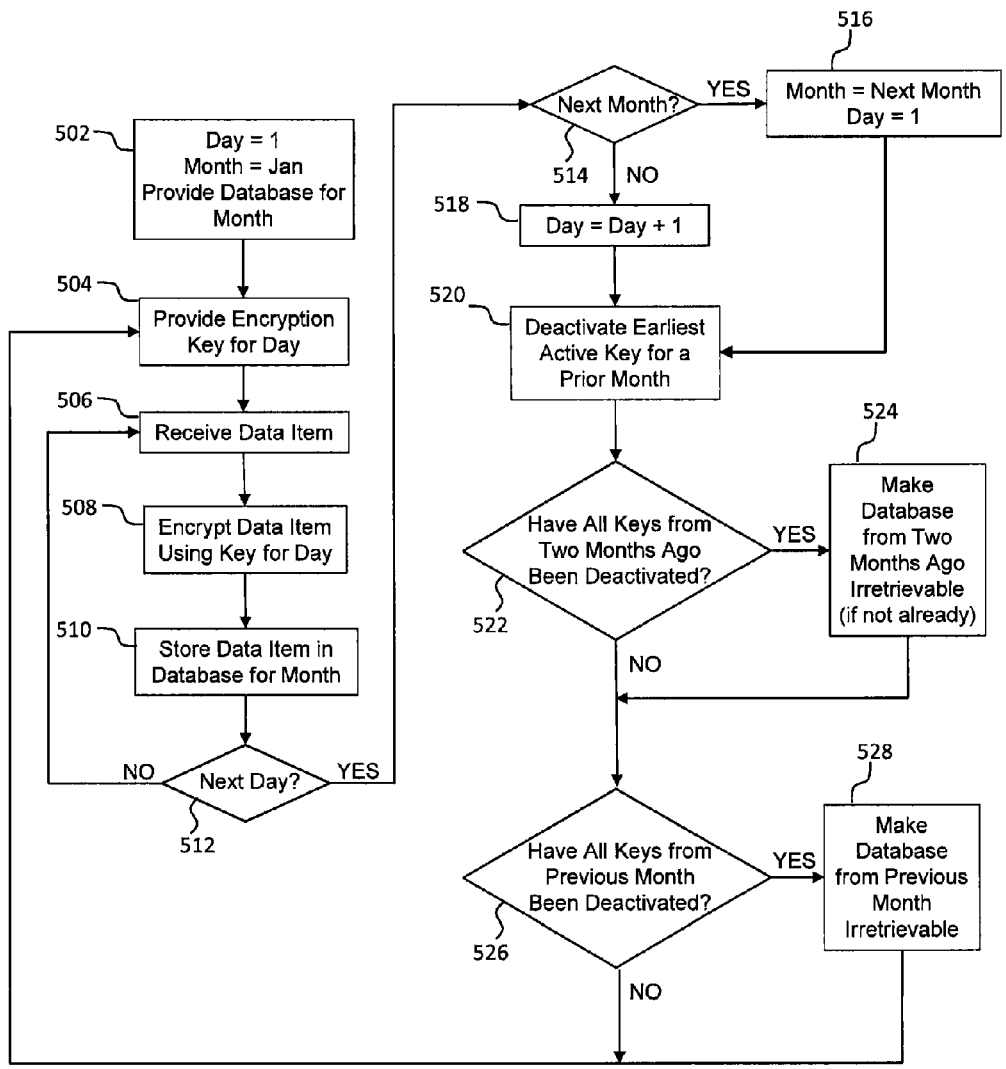
FIG. 5 is a flow chart that illustrates a method that uses a different database for each month of the year.

Referring to FIG. 5, a flow diagram illustrates another implementation of a method that uses a different database for each month of the year. At step 502, a counter Day is initialized to one, a counter Month is initialized to January, and a Database for January is provided. At step 504, an encryption key is provided for Day 1 of January (i.e., the first encryption time period). At steps 506, 508, and 510, data items are received, encrypted using the encryption key for Day 1, and stored in the Database for January. At step 512, a determination is made as to whether it is the next day. If not, the method loops back to step 506 and continues to receive data, encrypt data using the encryption key for Day 1, and store data in the Database for January. Once it is determined that it is the next day, at step 514, the method queries whether it is also the next month. If the answer is no, then, at step 516, the Day is incremented by one to the next Day. If the answer is yes, then, at step 518, the Month is incremented to the next month (e.g., from January to February), and the Day is reset to one.

At step 520, the earliest previous active encryption key from a previous month is deactivated. For example, when the Month and Day are incremented to February 1, the encryption key from January 1 is deactivated. Thereafter, during each day in February the earliest previous active key from January is deactivated. Thus, on February 2 the key from January 2 is deactivated, on February 3, the key from January 3 is deactivated, and so on through the last day of February (i.e., February 28 or 29). When the Month and Day are incremented to March 1, there are still keys active from January 30 and 31 (and 29 if not a leap year). Thus, in a non-leap year, on March 1, the key from January 29 is deactivated, on March 2, the key from January 30 is deactivated, on March 3, the key from January 31 is deactivated, and on March 4, the key from February 1 is deactivated. This cycle continues throughout the months of each year. Determining which key to deactivate can be done in at least one or two ways. First, a calendar or mathematical algorithm can determine the earliest active key based on the current date. Second, a log of the keys can be kept and the earliest key deactivated. The keys can be deactivated in the ways described above.

At step 522, the method queries whether all of the keys from two months ago have been deactivated. For example, on each day in March, the method queries whether all of the keys from January have been deactivated. This query can be done in one of at least two ways. First, a mathematical algorithm or a calendar can be used, to determine whether all of the keys from two months ago have been deactivated. Second, a searchable log can be kept of all previously used and deactivated encryption keys. If all of the keys from two months ago have been deactivated, then, at step 524, the database from two months ago is made irretrievable (if it has not been done so already). For example, in a non-leap year, on March 3, it will be determined that all of the keys from January have been deactivated, and the database from January will be made irretrievable. This can be done, for example, by placing the data in an escrow that cannot be easily accessed, locking the database, deleting the data in the database, reformatting the database, or overwriting the data in the database. The database from January may never be used again, can be used again the following January, or can be used again for another month of the same year, for example, for April.

At step 526, the method queries whether all of the keys from the previous month have been deactivated. For example, on each day in March, the method queries whether all of the keys from February have been deactivated. This query can be done similarly to the query for the keys from two months ago. If all of the keys from the previous month are deactivated, then, at step 528, the database from the previous month is made irretrievable, as described above. For example, in a non-leap year, on March 31, it will be determined that all of the keys from February have been deactivated and the database from February will be made irretrievable. The checks of two months ago (step 522) and one month ago (step 526) are made because there is a different number of days in some of the months.

After the check of step 526, the method loops back to step 504 to generate a new encryption key and to receive data for a new day. This method can continue ad infinitum throughout the following months and years.

Figure 6:
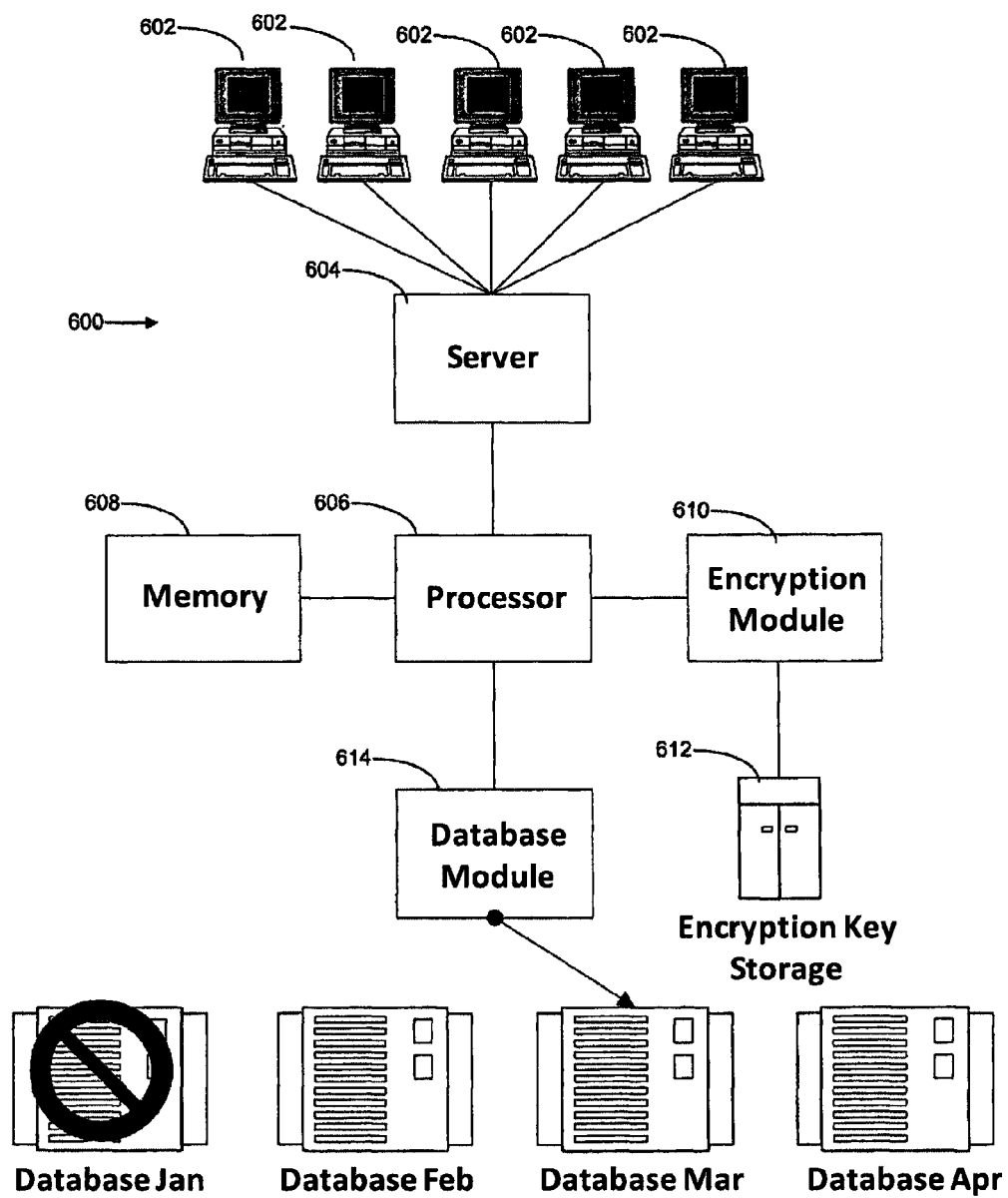
FIG. 6 illustrates an implementation of a system that can be used to carry out the method of FIG. 5.

The above method can be implemented on computer hardware or software, on a computer network, or on a system. FIG. 6 illustrates an implementation of a system 600 used to carry out this method. The system includes one or more client computers 602 that are coupled to a central server 604 by one or more of, for example, an Ethernet connection, a wireless network connection, a LAN, a WAN, an Internet connection, or another client or server. The server 604 is coupled to a processor 606 for executing instructions for the method that are stored in a memory 608, such as a hard disk, a CD ROM, a floppy disk, an integrated circuit board, a computer chip, or a memory card or stick. Coupled to the processor 606 is an encryption key module 610 and an encryption key storage 612 that together generate, store, and deactivate encryption keys used for the method. Also coupled to the processor 606 is a database control module 614 that provides, selects, stores, retrieves, locks, and deletes data from Databases January, February, March, April, etc. As shown in FIG. 4, Database January has been made irretrievable, while data is being written to Database March.

In another implementation, the above described methods and computer hardware, software, networks, and systems can be further enhanced as follows. Each time a data entry is stored in one of the databases, a marker is stored in a data storage memory that indicates which database in which the data is stored. When a request is made to retrieve the data item, the memory is consulted to determined which database contains the data item. Thus, only one database will need to be searched to retrieve the data item. If the data item is stored again, the data item will be stored in the currently active database and a new market will be stored in the data storage memory.

The above described methods and computer hardware, software, networks, and systems have a wide variety of applications. For example, an internet service provider can use these systems and methods to store, and later remove, internet searches performed by users. Electronic mail providers can use these methods and systems to more efficiently manage the storage and removal of electronic mail messages. Document management providers can use these methods and systems to more efficiently manage storage and removal of documents. Financial services providers can use these methods and systems for the more efficient storage and removal of financial data for customers. The use of these methods and systems can result in savings of search time and storage costs. These methods and systems also can provide for automated removal of data, for example, to implement a data destruction policy, such as needed for legal reasons.

A number of implementations have been described. Nevertheless, it will be understood that various modifications may be made. For example, the process can be used with a single database that is partitioned into sections that are periodically locked, deleted, or otherwise made irretrievable. The method can be implemented such that the data is stored using encryption keys, which are later deactivate after a predetermined amount of time, independent of making any database irretrievable. The method also can be implemented so that databases are periodically made irretrievable absent the use of storing data using encryption keys. More than one encryption key or no encryption key at all can be used for storing the data in the databases. The encryption keys can be reused after they have been deactivated. The stored data may be only partially irretrievable. For example, the stored data may be made irretrievable to client users of the system but remain accessible to the system administrators. The irretrievable databases and deactivated encryption keys may be stored in an escrow such that the data and the keys only can be accessed by certain personnel in an emergency situation. The time periods set forth above are by way of example only and can be different. For example, the period of time that an encryption key is used to encrypt and store data can be any amount of time, including any number of seconds, minutes, hours, days, months, and/or years. In addition, a key may be deactivated after any amount of time, including any number of seconds, minutes, hours, days, months, and/or years. Similarly, period of time that data is stored in a given database can be any amount of time, including any number of seconds, minutes, hours, days, months, and/or years. These and other implementations are within the scope of the following claims.

What is claimed is:

1. A computer-implemented method for data management, comprising:
   obtaining information associated with an encryption key, the information comprising an encryption time period for the encryption key;
   determining whether the encryption key is valid based on at least the encryption time period;
   deactivating, with at least one processor, the encryption key when the encryption key is invalid;
   identifying at least one database including encrypted data associated with the deactivated encryption key and with one or more additional encryption keys, the at least one database having a database time period, the encrypted data being associated with corresponding times that fall within the encryption time period and the database time period;
   in response to the encryption key being deactivated, disabling, with the at least one processor, access to the encrypted data associated with the deactivated encryption key and included in the at least one database;
   in response to determining that at least one of the one or more additional encryption keys is not valid and that the database time period has elapsed, making the encrypted data in the at least one database associated with each of the one or more additional encryption keys irretrievable; and
   wherein the encrypted data that is associated with the deactivated encryption key and included in the at least one database remain retrievable until a determination that all encryption keys are not valid and that the database time period has elapsed.

2. The method of claim 1, further comprising:
   receiving a plurality of data;
   selecting a subset of the received data associated with corresponding times that fall within the encryption time period; and
   encrypting the subset of the received data using the encryption key to generate the encrypted data.

3. The method of claim 2, further comprising receiving information identifying a plurality of databases associated with corresponding database time periods.

4. The method of claim 3, further comprising:
   selecting the at least one database from the plurality of databases;
   determining whether the database time period associated with the at least one database includes the times associated with the encrypted data; and
   storing the encrypted data in the at least one database when the database time period associated with the at least one database includes the encrypted data times.

5. The method of claim 1, wherein determining whether the encryption key is valid comprises:
   determining whether the encryption time period has expired; and
   determining that the encryption key is invalid when the encryption time period has expired.

6. The method of claim 5, wherein deactivating the encryption key comprises:
   deactivating the encryption key at a predetermined time after the encryption time period has expired.

7. The method of claim 1, wherein disabling access to the encrypted data associated with the deactivated encryption key and included in the at least one database comprises:
   deleting the encrypted data from the at least one database.

8. The method of claim 1, wherein disabling access to the encrypted data associated with the deactivated encryption key and included in the at least one database comprises:
   identifying an access level associated with the user; and
   modifying the ability of the user to access the encrypted data in accordance with the identified access level.

9. An apparatus, comprising:
   a storage device that stores a set of instructions; and
   at least one processor that is coupled to the storage device, the at least one processor configured to execute the set of instructions to:
   obtaining information associated with an encryption key, the information comprising an encryption time period for the encryption key;
   determining whether the encryption key is valid based on at least the encryption time period;
   deactivating the encryption key when the encryption key is invalid;
   identifying at least one database including encrypted data associated with the deactivated encryption key and with one or more additional encryption keys, the at least one database having a database time period, the encrypted data being associated with corresponding times that fall within the encryption time period and the database time period;

in response to the encryption key being deactivated, disabling access to the encrypted data associated with the deactivated encryption key and included in the at least one database;

in response to determining that at least one of the one or more additional encryption keys is not valid and that the database time period has elapsed, making the encrypted data in the at least one database associated with each of the one or more additional encryption keys irretrievable; and wherein the encrypted data that is associated with the deactivated encryption key and included in the at least one database remain retrievable until a determination that all encryption keys are not valid and that the database time period has elapsed.

10. The apparatus of claim 9 wherein the processor is further configured to execute the instructions to:

receive a plurality of data;

select a subset of the received data associated with corresponding times that fall within the encryption time period; and encrypt the subset of the received data using the encryption key to generate the encrypted data.

11. The apparatus of claim 10, wherein the processor is further configured to execute the instructions to:

receive information identifying a plurality of databases associated with corresponding database time periods;

select the at least one database from the plurality of databases;

determine whether the database time period associated with the at least one database includes the times associated with the encrypted data; and store the encrypted data in the at least one database when the database time period associated with the at least one database includes the encrypted data times.

12. The apparatus of claim 9, wherein the processor is further configured to execute the instructions to:

determine whether the encryption time period has expired; and determine that the encryption key is invalid when the encryption time period has expired.

13. The apparatus of claim 12, wherein the processor is further configured to execute the instructions to deactivate the encryption key at a predetermined time after the encryption time period has expired.

14. The apparatus of claim 9, wherein the processor is further configured execute the instructions to disable access to the encrypted data by deletion of the encrypted data from the at least one database.

15. The apparatus of claim 9, wherein processor is further configured to execute the instructions to disable access to the encryption data by:

identification of an access level associated with a user; and modification of the ability of the user to access the encrypted data in accordance with the identified access level.

16. A non-transitory computer-readable storage media storing instructions that are executable by at least one processor to perform a method for data management, the method comprising:

obtaining information associated with an encryption key, the information comprising an encryption time period for the encryption key;

determining whether the encryption key is valid based on at least the encryption time period;

deactivating the encryption key when the encryption key is invalid;

identifying at least one database including encrypted data associated with the deactivated encryption key and with one or more additional encryption keys, the at least one database having a database time period, the encrypted data being associated with corresponding times that fall within the encryption time period and the database time period;

in response to the encryption key being deactivated, disabling access to the encrypted data associated with the deactivated encryption key and included in the at least one database;

in response to determining that at least one of the one or more additional encryption keys is not valid and that the database time period has elapsed, making the encrypted data in the at least one database associated with each of the one or more additional encryption keys irretrievable; and wherein the encrypted data that is associated with the deactivated encryption key and included in the at least one database remain retrievable until a determination that all encryption keys are not valid and that the database time period has elapsed.

\* \* \* \* \*